United States Patent
Rook

(10) Patent No.: US 9,919,794 B2
(45) Date of Patent: Mar. 20, 2018

(54) SYSTEM AND METHOD FOR STIFFENED TORQUE BAR

(71) Applicant: Goodrich Corporation, Charlotte, NC (US)

(72) Inventor: Todd Rook, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 317 days.

(21) Appl. No.: 14/976,211

(22) Filed: Dec. 21, 2015

(65) Prior Publication Data
US 2017/0174328 A1 Jun. 22, 2017

(51) Int. Cl.
| | |
|---|---|
| B64C 25/44 | (2006.01) |
| B64C 25/42 | (2006.01) |
| B64C 25/36 | (2006.01) |
| F16F 7/08 | (2006.01) |
| F16D 55/36 | (2006.01) |
| F16D 55/00 | (2006.01) |
| F16D 65/02 | (2006.01) |

(52) U.S. Cl.
CPC .............. *B64C 25/42* (2013.01); *B64C 25/36* (2013.01); *F16D 55/36* (2013.01); *F16F 7/08* (2013.01); *F16D 2055/0008* (2013.01); *F16D 2065/1384* (2013.01); *F16D 2065/1392* (2013.01)

(58) Field of Classification Search
CPC ......... B64C 25/44; B64C 25/42; F16D 55/36; F16D 55/02; F16D 65/10; F16D 65/82; F16D 65/827; F16D 65/847
See application file for complete search history.

(56) References Cited

U.S. PATENT DOCUMENTS

| | | | |
|---|---|---|---|
| 5,499,705 A | 3/1996 | Ide | |
| 7,051,845 B2* | 5/2006 | Thorp | F16D 55/36 188/71.6 |
| 7,156,212 B1 | 1/2007 | Ciotti et al. | |
| 7,475,762 B2* | 1/2009 | Kaczynski | C23C 4/06 188/18 A |
| 7,614,340 B2 | 11/2009 | Steinke et al. | |
| 8,668,276 B2* | 3/2014 | Hall | B64C 25/36 301/6.1 |
| 2017/0174330 A1* | 6/2017 | Rook | B64C 25/42 |

FOREIGN PATENT DOCUMENTS

| | | |
|---|---|---|
| EP | 2940340 | 11/2015 |
| WO | 2007118254 | 10/2007 |
| WO | 2008097386 | 8/2008 |

OTHER PUBLICATIONS

EP Search Report dated Sep. 7, 2017 in EP Application No. 16205424.1.

* cited by examiner

*Primary Examiner* — Jason R Bellinger
(74) *Attorney, Agent, or Firm* — Snell & Wilmer, L.L.P.

(57) ABSTRACT

A stiffened torque bar is provided. Stiffened torque bar may include a torque bar body, a mounting hole, and a bolt strap. Stiffened torque bar may also comprise a first sleeve and a second sleeve. Stiffened torque bars of the present disclosure can exhibit improved desired characteristics, such as improved stiffness and vibration damping in order to enhance dynamic stability in the stiffened torque bar.

20 Claims, 5 Drawing Sheets

SYSTEM AND METHOD FOR STIFFENED TORQUE BAR

FIELD

The present disclosure relates to components of wheel and brake assemblies, and more specifically, to stiffened torque bars.

BACKGROUND

Torque bars are typically used in aircraft wheel and brake assemblies to couple the wheels to the rotors of the brake assembly. Torque bars typically extend from an inner surface of the wheel in a direction parallel to the rotational axis of the wheel, and are subject to deflection and vibration. Torque bars of the prior art typically have a bolted end and a slender pin end that is very flexible. Torque bars are a main structural component in the primary load path of the brake torque.

SUMMARY

In various embodiments, a stiffened torque bar is disclosed. The stiffened torque bar may comprise a torque bar body, a bolt strap, and a mounting hole. The torque bar body may have a first end and a second end. The bolt strap may have a front surface and a back surface, and a first aperture and a second aperture. The front surface of the bolt strap may be perpendicularly coupled between the first aperture and the second aperture to the second end of the torque body. The mounting hole may be located in the torque bar body by the first end.

In various embodiments, a wheel and brake assembly is disclosed. The wheel and brake assembly may comprise a wheel having a radially inner surface and an at least one tie bolt hole. The wheel and brake assembly may comprise a brake assembly disposed within the wheel. The wheel and brake assembly may comprise an at least one stiffened torque bar. The at least one stiffened torque bar may comprise a torque bar body, a bolt strap, and a mounting hole. The at least one stiffened torque bar may couple to the radially inner surface at the mounting hole. The bolt strap may be coupled to the at least one tie bolt hole of the wheel.

In various embodiments, a method for installing a stiffened torque bar onto a wheel and brake assembly may comprise mounting the stiffened torque bar onto the wheel and brake assembly. The stiffened torque bar may comprise a torque bar body, a bolt strap, and a mounting hole. The wheel may comprise a radially inner surface and an at least one tie bolt hole. The method may also comprise coupling the bolt strap to the wheel. The method may also comprise coupling the stiffened torque bar to the radially inner surface of the wheel.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
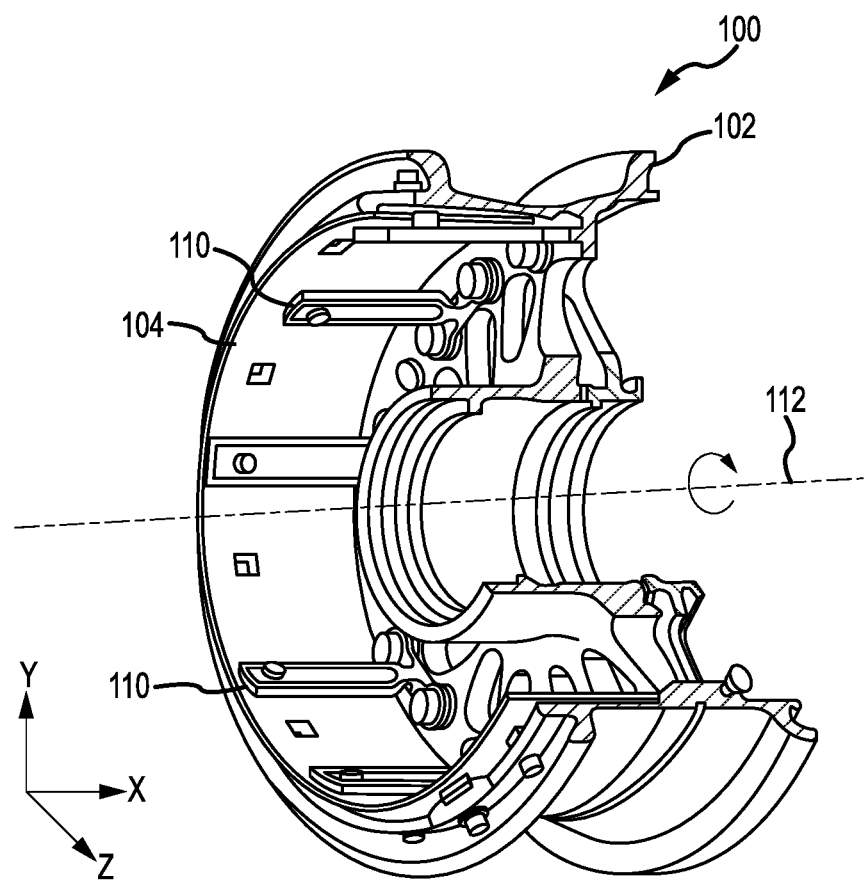
FIG. 1 illustrates a perspective view of a wheel and brake housing, in accordance with various embodiments.
Figure 2:
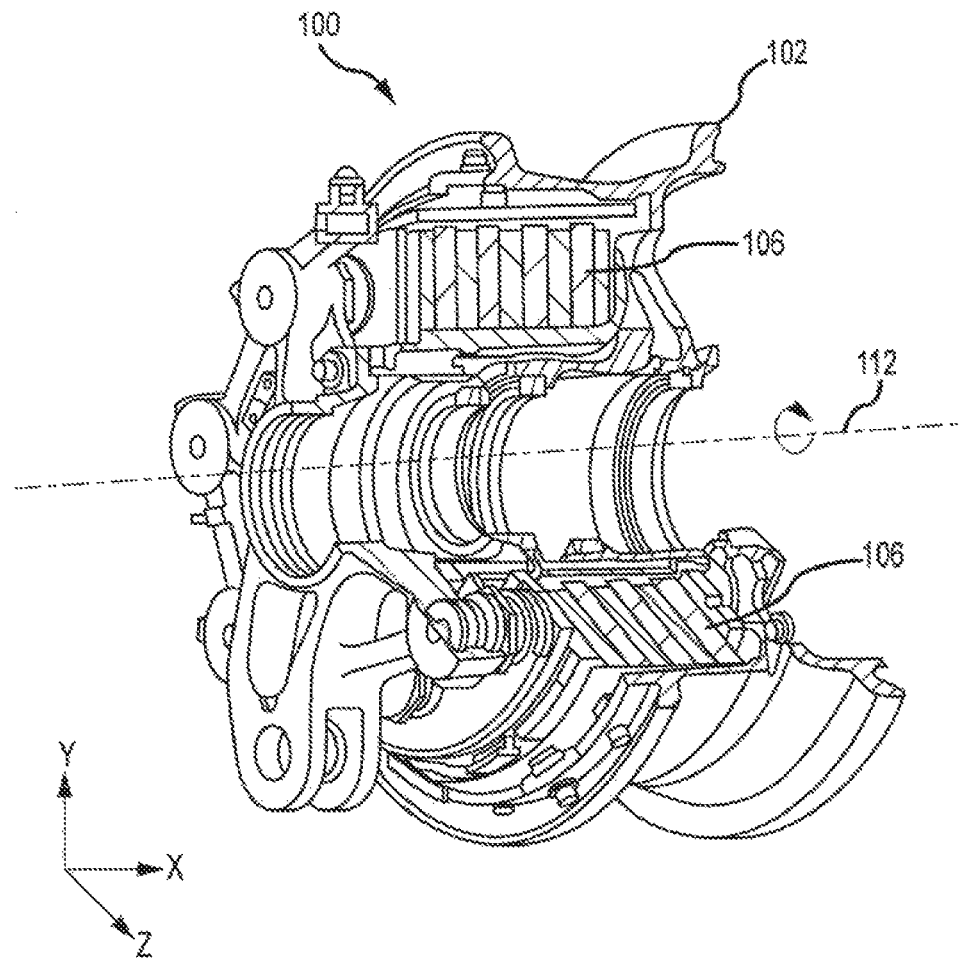
FIG. 2 illustrates a perspective view of a wheel and brake housing, in accordance with various embodiments.

In various embodiments and with reference to FIGS. 1 and 2, a wheel and brake assembly 100 may comprise a wheel 102 having a radially inner surface 104. A brake assembly 106 is disposed within wheel 102. In various embodiments, a plurality of torque bars 110 are oriented parallel to an axis of rotation 112 and coupled to wheel 102 and radially inner surface 104, and configured to engage with brake assembly 106.

A torque bar may comprise a mounting hole on one end and a pin on the opposite end. The mounting hole may be configured to couple the torque bar to the radially inner surface. The pin may be configured to couple the torque bar to the wheel. For example, the wheel may comprise a pin receptacle configured to receive the pin. Pin receptacle may be located between tie bolt holes.

The torque bar is a main structural component in the primary load path of the brake torque. During braking, the torque bar may experience different vibration modes. The pin connection may be flexible and may comprise a loose connection with the wheel. In higher frequency whirl vibration modes, typically a "wobble" motion occurring during high velocity landing stops, this flexible and loose connection causes the torque bar to "jump rope," i.e., to move radially inward and outward with respect to the axis of rotation, leading to lower stability margins. Brake vibration can be a serious issue, and may result in damage to aircraft components if not properly managed.

Figure 3A:
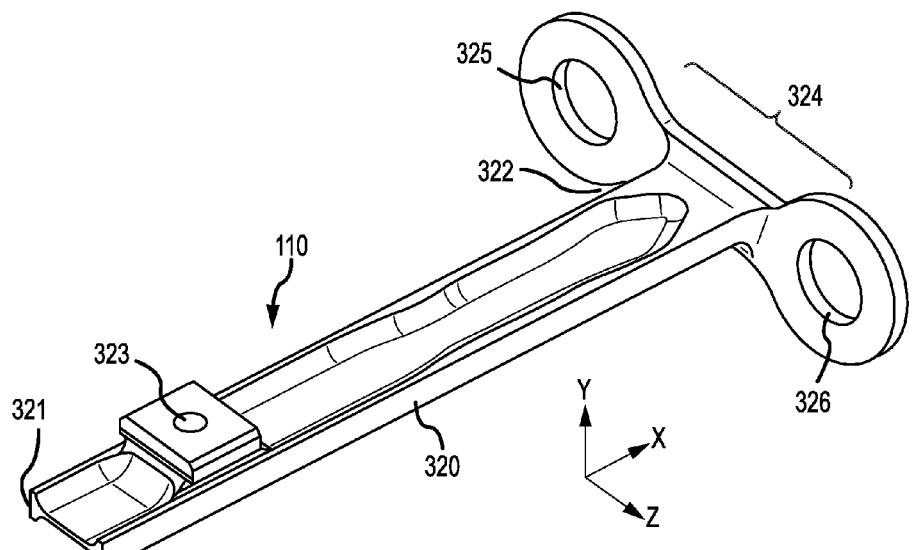
FIG. 3A illustrates a perspective view of a stiffened torque bar, in accordance with various embodiments.
Figure 3B:
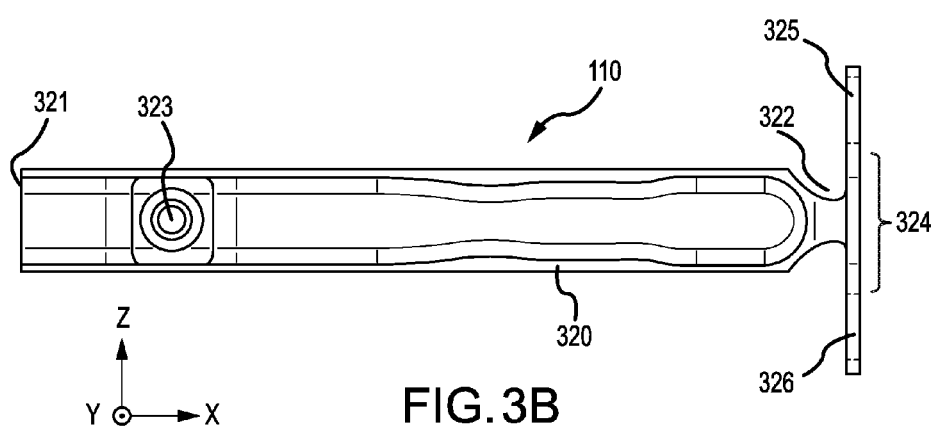
FIG. 3B illustrates a top view of a stiffened torque bar, in accordance with various embodiments.

In various embodiments, and with reference to FIGS. 3A and 3B, a system, method, and apparatus for a stiffened torque bar 110 replaces the traditional pin end connection typical in the prior art with a bolt strap 324 that distributes the reaction load and increases the effective section modulus of the torque bar, thereby providing a tighter connection to the wheel and stiffening the torque bar during vibration. Stiffened torque bar 110 may increase the stiffness over typical prior art torque bars by a factor of two. Stiffened torque bar 110 may comprise a torque bar body 320, a mounting hole 323, and a bolt strap 324. In various embodiments, stiffened torque bar 110 may also comprise a first sleeve and a second sleeve, as shown, for example, in FIG. 4.

In various embodiments, stiffened torque bar 110 may comprise a one piece-device apparatus made using any suitable process such as, for example, machining, investment casting, and or the like. Stiffened torque bar 110 may also be an assembly of parts. In various embodiments, stiffened torque bar 110 may be made by an additive manufacturing process, such as, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, digital light processing, and/or any other suitable additive manufacturing process.

In various embodiments, stiffened torque bar 110 may be made of any suitable material. Stiffened torque bar 110 may be made from any substantially rigid and durable material. For example, stiffened torque bar 110 may comprise a metal material, such as steel or a nickel-based superalloy. Stiffened torque bar 110 may also have any suitable coating. In this regard, a suitable coating may comprise a coating that does not have a high coefficient of friction such that the surface ends up being locked, but also does not have a low coefficient of friction that no or little friction would be generated. For example, and in various embodiments, a suitable coating may have a coefficient of friction value between 0.3 and 0.6. In various embodiments, a tungsten carbide cobalt coating may be used. Similarly, any other suitable type of coating may also be used.

In various embodiments, a torque bar body 320 may be configured to provide structural support for a stiffened torque bar 110. Torque bar body 320 may comprise a first end 321 and a second end 322. First end 321 may comprise the end of torque bar body 320 intended to be disposed closest to the proximal side of the wheel. Second end 322 may comprise the end of torque bar body 320 intended to be disposed closest to the distal side of the wheel. In various embodiments, the proximal side of the wheel may be the inboard side of the wheel, and the distal side of the wheel may be the outboard side of the wheel. Second end 322 may be configured to comprise and/or removably couple to a bolt strap 324. In various embodiments, torque bar body 320 may comprise any shape and size suitable to provide structural support for a stiffened torque bar 110, such as a rectangular shape. Torque bar body 320 may comprise a single, solid part. In various embodiments, torque bar body 320 may also comprise voids, depressions, cutouts, and other similar features located throughout the body of torque bar body 320. Such features may reduce weight and may increase stiffness.

In various embodiments, a mounting hole 323 may be configured to removably couple the stiffened torque bar 110 to radially inner surface of a wheel. For example, as illustrated in FIG. 1, a bolt can be passed through mounting hole 323 and into a bolt hole in radially inner surface 104. The bolt may then be tightened to couple stiffened torque bar 110 to radially inner surface 104 of the wheel 102. Mounting hole 323 may comprise any shape and size suitable to couple the stiffened torque bar 110 to radially inner surface 104 of wheel 102. In various embodiments, mounting hole 323 may also be threaded to accept a bolt.

In various embodiments, a bolt strap 324 may be configured to removably couple the stiffened torque bar 110 to a wheel. Bolt strap 324 may have a front surface and a back surface. Bolt strap 324 may be located at the second end 322 of torque bar body 320. In this regard, bolt strap 324 may be perpendicularly coupled at the front surface to the second end 322 of torque bar body 320. Bolt strap 324 may be any suitable shape and size. For example, bolt strap 324 may be rectangularly shaped.

In various embodiments, bolt strap 324 may comprise a first aperture 325 and a second aperture 326. First aperture 325 and second aperture 326 may be located in any suitable location on bolt strap 324. In this regard, first aperture 325 and second aperture 326 may be located equidistant from the outer edges of bolt strap 324. In various embodiments, bolt strap 324 may couple to torque bar body at a location between first aperture 325 and second aperture 326.

First aperture 325 and second aperture 326 may be configured to couple bolt strap 324 to a wheel. In this regard, bolt strap 324 may be aligned to straddle two tie bolt holes, with first aperture 325 aligning to the first tie bolt hole, and second aperture 326 aligning to the second tie bolt hole. First aperture 325 and second aperture 326 may each be configured to receive a tie bolt. First aperture 325 and second aperture 326 may have any width suitable to receive a tie bolt. Tie bolts may pass through first aperture 325 and/or second aperture 326, and into the preexisting tie bolt holes of the wheel. In this regard, and in various embodiments, no additional changes to the wheel would be necessary. Bolt strap 324 would therefore couple to wheel through the use of preexisting tie bolts and preexisting tie bolt holes.

Figure 4:
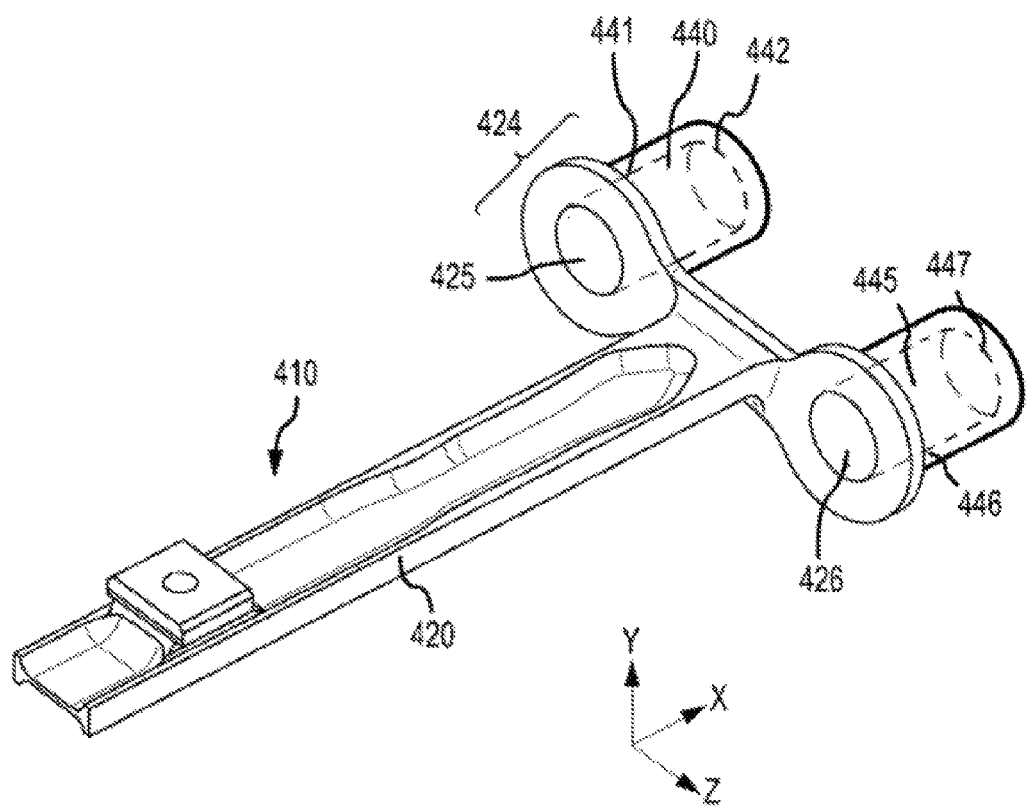
FIG. 4 illustrates a perspective view of a stiffened torque bar, in accordance with various embodiments.

In various embodiments, and with reference to FIG. 4, a first sleeve 440 and a second sleeve 445 may be configured to further provide beneficial anti-vibration characteristics in stiffened torque bar 410 in response to the stiffened torque bar 410 being coupled to a wheel. In this regard, the use of first sleeve 440 and second sleeve 445 in stiffened torque bar 410 may increase the stiffness of the stiffened torque bar 110 by a factor of two. This additional stiffness increase may therefore increase the overall stiffness of stiffened torque bar 410, when compared to typical torque bars of the prior art, by a total factor of four.

In various embodiments, first sleeve 440 may comprise a first end 441 and a second end 442. First end 441 of first sleeve 440 may be configured to substantially align with first aperture 425, and may be coupled to the back surface of bolt strap 424. In this regard, first sleeve 440 may define a boundary of first aperture 425, and may protrude at second end 442 of first sleeve 440 in a direction axially away from torque bar body 420. Second sleeve 445 may comprise a first end 446 and a second end 447. First end 446 may be configured to substantially align with second aperture 426, and may be coupled to the back surface of bolt strap 424. In this regard, second sleeve 445 may define a boundary of second aperture 426, and may protrude at second end 447 of second sleeve 445 in a direction axially away from torque body 420. In various embodiments, first sleeve 440 and second sleeve 445 may be configured to slide partially within first aperture 425 and second aperture 426, respectively, such that first end 441 of first sleeve 440 and first end 446 of second sleeve 445 protrude axially towards torque bar body 420, and past the front surface of bolt strap 424. First sleeve 440 and second sleeve 445 may also protrude in a parallel direction to each other. First sleeve 440 and second sleeve 445 may be any suitable size, shape, length, and width.

In various embodiments comprising first sleeve 440 and second sleeve 445, tie bolt holes of the wheel may be widened to operatively fit first sleeve 440 and second sleeve 445. In this regard, tie bolt holes may be widened to any diameter such that first sleeve 440 and/or second sleeve 445 may operatively fit within the tie bolt hole. Tie bolt holes may be widened using any suitable method, such as, for example, by boring out the preexisting tie bolt hole. A wheel may also be built having tie bolt holes of a suitable diameter. As an example, in various embodiments where first sleeve 440 and/or second sleeve 445 are ¾", 1.905 cm, in diameter, tie bolt holes may be widened to be slightly larger than ¾", 1.905 cm, in diameter, such as to ¹³⁄₁₆", 2.06375 cm, in diameter. First sleeve 440 and/or second sleeve 445 may therefore fit within tie bolt holes such that bolt strap 424 is substantially flat on the surface of wheel when first sleeve 440 and/or second sleeve 445 are inserted into the tie bolt hole.

In various embodiments, an at least one tie bolt may then be passed through first aperture 425 and/or second aperture 426 of bolt strap 424, passed through first sleeve 440 and/or second sleeve 445, respectively, and into a tie bolt hole. The at least one tie bolt may then be tightened to couple the stiffened torque bar 410 to the wheel. Having first sleeve 440 and second sleeve 450 operatively fit within tie bolt holes further stiffens the stiffened torque bar, increasing its resistance various modes of vibration, such as "jump roping."

Figure 5:
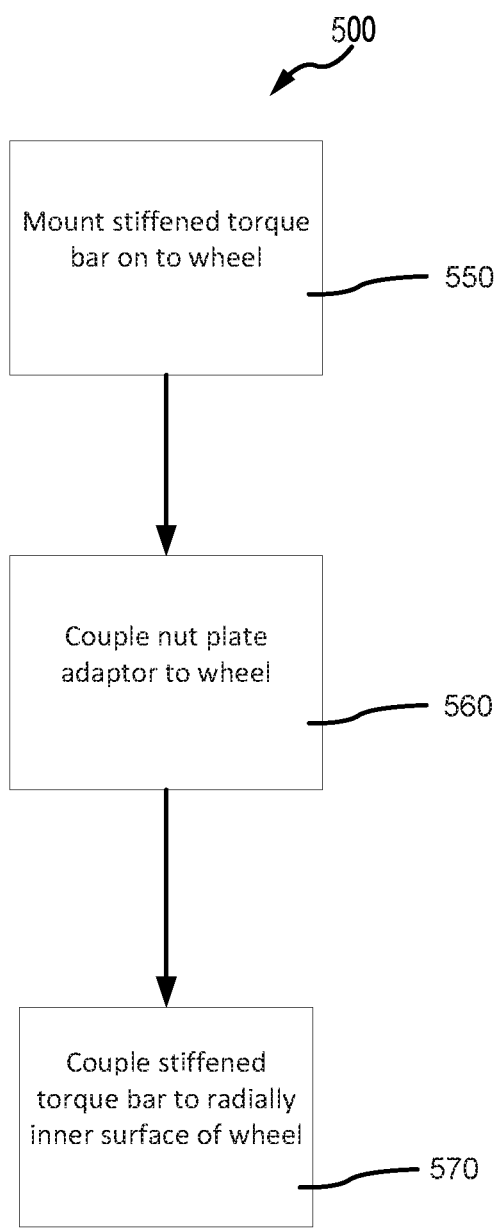
FIG. 5 illustrates a method of installing a stiffened torque bar, in accordance with various embodiments.

In various embodiments, and with reference to FIG. 5, a method 500 for installing stiffened torque bar is provided. Method 500 may comprise mounting stiffened torque bar on to a wheel (Step 550). Method 500 may comprise coupling bolt strap to a wheel (Step 560). For example, Step 560 may comprise lining up the first aperture and second aperture of bolt strap to tie bolt holes in wheel. Step 560 may also comprise inserting a tie bolt through first aperture and second aperture, and tightening the tie bolt into the tie bolt hole. In various embodiments comprising a first sleeve and/or a second sleeve, Step 560 may also comprise inserting first sleeve and/or second sleeve into a widened tie bolt hole. Method 500 may comprise coupling stiffened torque bar to radially inner surface of wheel (Step 570). Step 570 may comprise sliding a bolt through mounting hole and into radially inner surface. Step 570 may also comprise coupling stiffened torque bar to radially inner surface using any other suitable means. However, any method of installing stiffened torque bar is within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stiffened torque bar, comprising:
    a torque bar body having a first end and a second end;
    a bolt strap having a front surface and a back surface and a first aperture and a second aperture, wherein the bolt strap is perpendicular to the torque bar body, and wherein the bolt strap meets the torque bar body between the first aperture and the second aperture; and
    a mounting hole located in the torque bar body by the first end.

2. The stiffened torque bar of claim 1, further comprising a first sleeve defining the first aperture and protruding from the first aperture in a direction axially away from the torque bar body, and a second sleeve defining the second aperture and protruding from the second aperture in a direction axially away from the torque bar body.

3. The stiffened torque bar of claim 2, wherein the first sleeve and the second sleeve are configured to operatively fit within a tie bolt hole of a wheel.

4. The stiffened torque bar of claim 1, wherein the first aperture and the second aperture are configured to receive a tie bolt.

5. The stiffened torque bar of claim 1, wherein the stiffened torque bar is formed by an additive manufacturing process.

6. The stiffened torque bar of claim 1, wherein the stiffened torque bar is formed by an investment casting process.

7. The stiffened torque bar of claim 1, wherein the stiffened torque bar is coated with a tungsten carbine cobalt coating.

8. A wheel and brake assembly, comprising:
 a wheel having a radially inner surface and an at least one tie bolt hole; and
 an at least one stiffened torque bar comprising:
  a torque bar body having a first end and a second end;
  a bolt strap having a front surface and a back surface and a first aperture and a second aperture, wherein the front surface of the bolt strap is perpendicularly coupled between the first aperture and the second aperture to the second end; and
  a mounting hole located in the torque bar body by the first end;
 wherein the at least one stiffened torque bar is coupled to the radially inner surface at the mounting hole, and the bolt strap is coupled to the at least one tie bolt hole.

9. The wheel and brake assembly of claim 8, wherein the at least one stiffened torque bar further comprises a first sleeve defining the first aperture and protruding from the first aperture in a direction axially away from the at least one torque bar body, and a second sleeve defining the second aperture and protruding from the second aperture in a direction axially away from the at least one torque bar body.

10. The wheel and brake assembly of claim 9, wherein the first sleeve and the second sleeve are configured to operatively fit within the at least one tie bolt hole of the wheel.

11. The wheel and brake assembly of claim 8, wherein the bolt strap is coupled to the wheel by inserting a tie bolt through the first aperture and a tie bolt through the second aperture, and securing the tie bolts into the at least one tie bolt hole.

12. The wheel and brake assembly of claim 8, wherein the at least one stiffened torque bar is formed by an additive manufacturing process.

13. The wheel and brake assembly of claim 8, wherein the at least one stiffened torque bar is formed by an investment casting process.

14. The wheel and brake assembly of claim 8, wherein the at least one stiffened torque bar is coated with a tungsten carbine cobalt coating.

15. A method, comprising:
 mounting a stiffened torque bar onto a wheel and brake assembly, wherein the stiffened torque bar comprises: a torque bar body having a first end and a second end; a bolt strap having a front surface and a back surface and a first aperture and a second aperture, wherein the front surface of the bolt strap is perpendicularly coupled between the first aperture and the second aperture to the second end; and a mounting hole located in the torque bar body by the first end; and the wheel and brake assembly comprises a wheel having a radially inner surface and an at least one tie bolt hole;
 coupling the bolt strap to the wheel; and
 coupling the stiffened torque bar to the radially inner surface.

16. The method of claim 15, wherein coupling the bolt strap to the wheel comprises inserting a tie bolt into the first aperture and a tie bolt into the second aperture, and securing the tie bolts into the at least one tie bolt hole.

17. The method of claim 15, wherein coupling the stiffened torque bar to the radially inner surface comprises inserting a bolt through the mounting hole and securing the bolt into a bolt hole in the radially inner surface.

18. The method of claim 15, wherein the stiffened torque bar further comprises a first sleeve defining the first aperture and protruding from the first aperture in a direction axially away from the torque bar body, and a second sleeve defining the second aperture and protruding from the second aperture in a direction axially away from the torque bar body.

19. The method of claim 18, further comprising inserting the first sleeve and the second sleeve into the at least one tie bolt hole of the wheel prior to coupling the bolt strap to the wheel.

20. The method of claim 19, wherein coupling the bolt strap to the wheel comprises inserting a tie bolt into the first aperture and through the first sleeve, and inserting a tie bolt into the second aperture and through the second sleeve, and securing the tie bolts into the at least one tie bolt hole.

* * * * *